March 6, 1962 L. L. KNOELL 3,023,970
SPRAY BOOM AND SPRAY BOOM MOUNTING MEANS
Filed Jan. 8, 1958 2 Sheets-Sheet 2

INVENTOR.
Lawrence Leo Knoell
BY
Fred C. Matheny
ATTORNEY

United States Patent Office 3,023,970
Patented Mar. 6, 1962

3,023,970
SPRAY BOOM AND SPRAY BOOM
MOUNTING MEANS
Lawrence Leo Knoell, Puyallup, Wash.
(Box 327, Milton, Wash.)
Filed Jan. 8, 1958, Ser. No. 707,721
4 Claims. (Cl. 239—167)

My invention relates to spraying apparatus of the type used on tractors, trailers and like wheel supported vehicles for spraying growing vegetation and particularly to spray boom and spray boom mounting means used in connection with such apparatus.

An object of my invention is to provide a spray boom and mounting means therefor which is very quickly and easily adjustable in positioning a horizontal spray pipe that forms part of said boom at different elevations above the ground and thereby vertically adjusting the spray pipe as required by crops of different height.

Another object is to provide a spray boom having a spray pipe which can be vertically adjusted by adjusting the boom swingingly about the axis of a spray pipe supporting bar.

Another object is to provide a spray boom comprising an open truss type frame having a spray pipe forming one side thereof.

Another object is to provide a spray boom comprising a spray pipe rotatively adjustable in a frame and forming one side member of said frame, the other side member of the frame being rotatively supported from a carrier vehicle by mounting means which provides for rotative adjustment of the frame about an axis substantially parallel to and transversely spaced from the spray pipe, whereby swinging adjustment of the frame about said axis will vertically adjust the spray pipe when said axis and spray pipe are substantially horizontal.

Other objects of my invention will be apparent from the following description and accompanying drawings.

FIG. 3 is a fragmentary view partly in section and partly in elevation taken substantially on broken line 3—3 of FIG. 1 and on a larger scale than FIG. 1, showing the two spray booms supported by mounting devices which offset said two booms relative to each other enough so that said booms can be positioned alongside of each other crosswise of the end of the vehicle by which they are carried.

FIG. 4 is a fragmentary sectional view similar to FIG. 3 except that it is taken substantially on broken line 4—4 of FIG. 1 and shows one of the spray booms in a different position.

FIG. 5 is a partly exploded fragmentary sectional view showing a bar mounting device of modified form by which a bar of a spray boom is supported for rotative and longitudinal and swinging adjustment.

FIG. 6 is a partly exploded fragmentary sectional view similar to FIG. 5 but showing another bar mounting device of modified form.

Like reference numerals refer to like parts throughout the several views.

Figure 1:
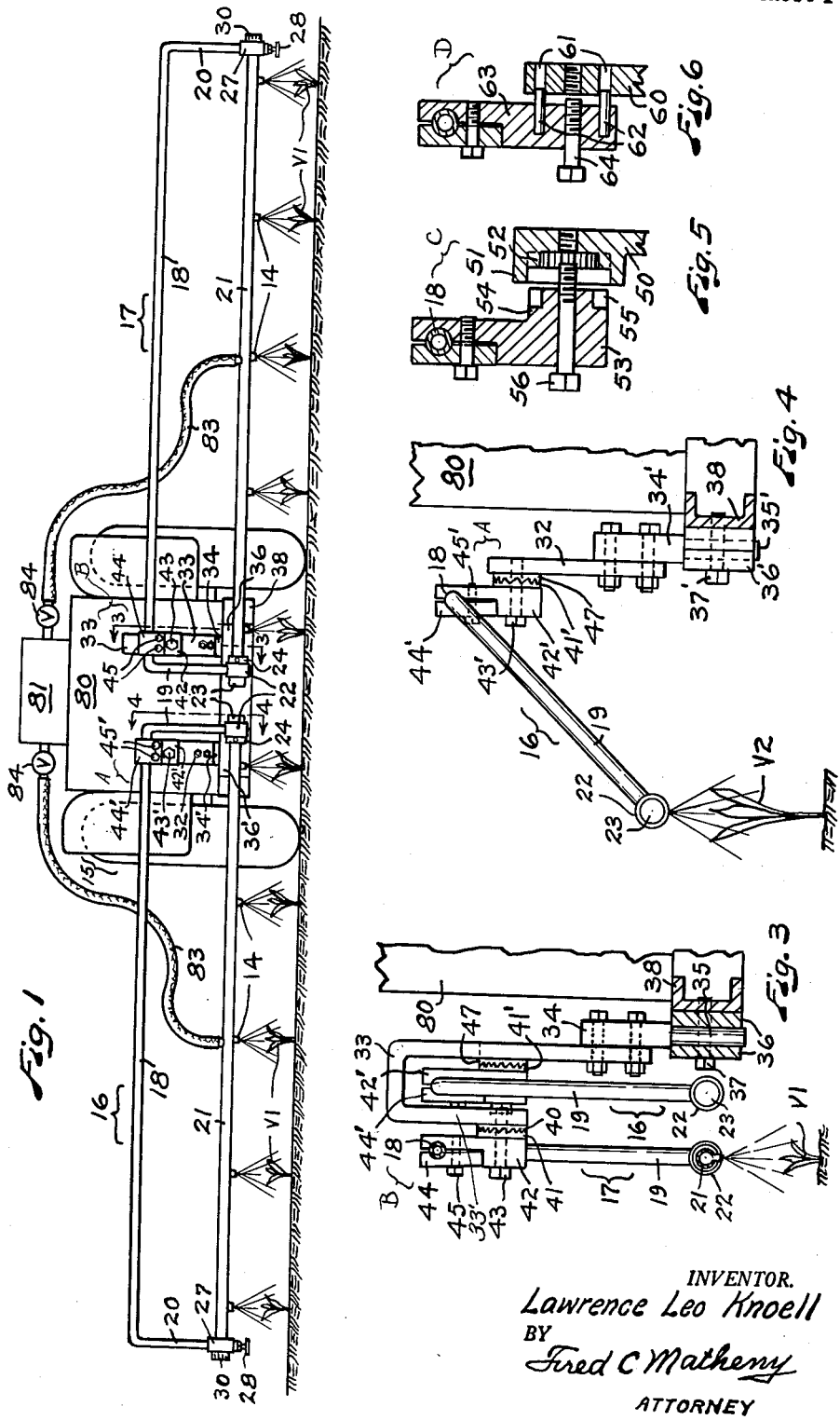
FIGURE 1 is a view in elevation of spray boom means constructed in accordance with my invention showing the same mounted on the rear end portion of a tractor and showing two spray booms extending from opposite sides of the tractor in approximately the position at which they would be set for directing spray downwardly onto short vegetation.
Figure 2:
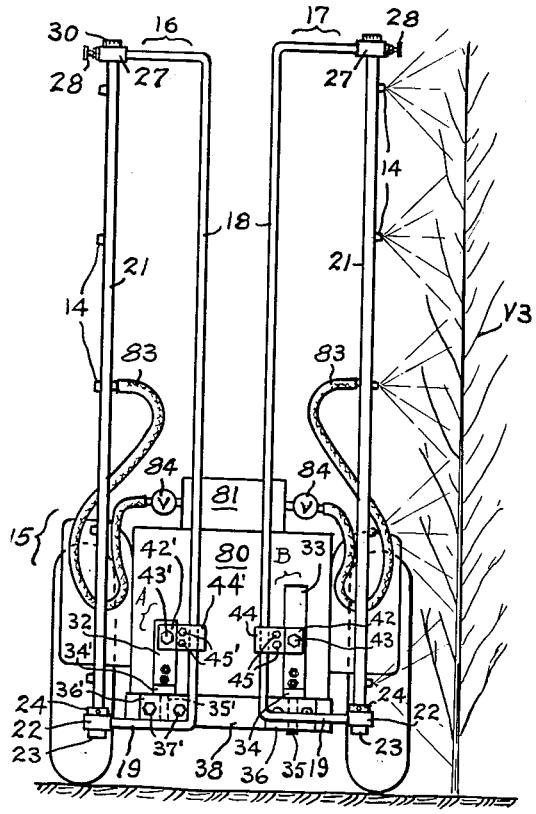
FIG. 2 is an elevational view similar to FIG. 1 except that it shows the two spray booms swingingly adjusted into upright positions for transportation or for spraying tall crops.

My spray booms may be mounted on any suitable wheel supported vehicle frame capable of carrying the booms and the means used in supplying spray liquid thereto. FIGS. 1 and 2 show a tractor 15 carrying the two spray booms. Said booms are indicated generally by 16 and 17. The booms 16 and 17 are of duplicate construction and the parts thereof are similarly numbered. Each spray boom is made up of a spray pipe supporting bar 18, two spaced apart arms 19 and 20 rigid with the respective end portions of the bar 18 and extending outwardly therefrom in a common plane, and a spray pipe 21 rotatively adjustably supported by the arms 19 and 20 in substantially parallel spaced relation to at least the part of the bar 18 adjacent to the end thereof from which said bar is supported. If bar 18 is supported from the end adjacent arm 19 then the end portion of said bar adjacent arm 20 does not need to be parallel to the spray pipe 21. Each bar 18 can be a pipe or it can be a rod of solid cross section. The arms 19 and 20 can be integral with the bar 18 and formed by bending the end portions of the bar at substantially right angles or they can be separate pieces welded or clamped or otherwise rigidly attached to the said bar 18.

Figure 9:
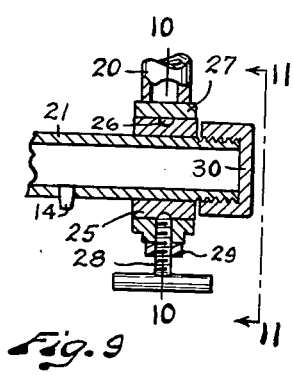
FIG. 9 is a detached fragmentary sectional view of devices used to clamp and support a spray pipe so that said pipe can be adjusted rotatively.
Figure 10:
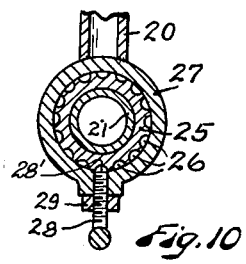
FIG. 10 is a sectional view taken on broken line 10—10 of FIG. 9.
Figure 11:
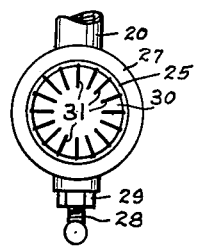
FIG. 11 is an elevation taken on line 11—11 of FIG. 9.

The terminal part of each arm 19, at the inner end of each boom, has a bearing ring 22 welded or otherwise rigidly attached thereto and the spray pipe 21 extends through and is rotatively supported in said ring 22. A cap 23 on the end of the spray pipe 21 abuts one side of the ring 22 and preferably a fixed collar 24 is provided on the pipe 21 abutting the other side of the ring 22. The end of each spray pipe 21 at the outer end of the boom, see FIGS. 9 and 10, has a bushing or sleeve 25 welded or otherwise rigidly secured thereon. The sleeve 25 has a plurality of spaced apart circumferential depressions 26 which facilitate clamping the spray pipe 21 in different adjusted positions. The sleeve 25 fits rotatively within a bearing ring 27. The ring 27 is welded or otherwise rigidly secured to the terminal part of the outer arm 20. A thumb screw 28, which preferably has a lock nut 29 thereon, is threaded through the ring 27 and the inner end 28′ of said set screw 28 is adapted to seat within one of the depressions 26 of the sleeve 25. This locks the spray pipe 21 in any desired rotatively adjusted position. The outer end of the spray pipe 21 is closed, preferably by a cap 30, and said cap 30 is provided with marks 31 FIG. 11, which are aligned with the depressions 26 in the sleeve 25 and indicate to a person who is adjusting the spray pipe 21 rotatively, the position of the spray outlet openings or nozzles 14 in said pipe. Preferably the marks 31 are on both the end and the peripheral wall of the cap 30 so they can be easily seen irrespective of whether the spray boom is in a horizontal or an upright position. The thumb screw 28 also locks the two collars 25 and 27 against relative endwise movement.

Preferably but not essentially the two booms 16 and 17 are adjustably mounted on the tractor 15, or other vehicle such as a trailer, in such a manner as to permit the two booms to be positioned in overlapped or juxtaposed relation crosswise of the end of the carrier vehicle. Two mounting devices A and B which will accomplish this purpose are shown in FIGS. 1 to 4 inclusive. The respective mounting devices A and B comprise two differently shaped transversely spaced apart boom supports 32 and 33. The support 33 to which the spray boom 17 is attached, see FIG. 3, is shaped somewhat like an inverted letter J. The longer limb of said support 33 has its lower end rigidly secured to a member 34. Preferably the member 34 terminates in a cylindrical part 35 which is firmly clamped by a clamp bracket 36 and bolts 37 to a part 38 of the tractor frame. This pivotal mounting formed by parts 34, 35, 36 and 37 will normally hold the boom in an extended position at substantially right angles to the tractor but it can be adjusted so it will serve as a safety device and yield if the boom encounters a fixed obstruction in use. The shorter limb 33′ of the J-shaped support 33 has a radially serrated or toothed boss 40 which mates with a similarly serrated boss 41 on a bracket plate 42. A bolt or cap screw 43 extends through the plate 42 and through bosses 41 and 40 and into the shorter limb of the support 33 and rigidly but adjustably secures the bracket plate 42 to the support 33. The bracket plate 42 has a notched upper end portion to which a clamp plate 44 is secured by cap screws 45.

The adjacent faces of the clamp plate 44 and bracket plate 42 have transverse semicircular grooves which register with each other and are adapted to fit over and securely clamp the spray pipe supporting bar 18 of the boom 17. The screws 45 can be tightened sufficiently to cause the clamp plate 44 to clamp the bar 18 tight enough so that said bar 18 will not move rotatively between the parts 42 and 44 during operation of the sprayer but may be rotatively moved manually without loosening said screw 45 in adjusting the height or elevation of the spray pipe 21. The arms 19 serve as levers in facilitating this adjustment. It is also possible to tighten the screws 45 sufficiently to hold the bar 18 very tightly, in which instance the screws 45 will have to be loosened to permit rotative adjustment of said bar. The screws 45 will always have to be loosened if the boom is to be adjusted longitudinally. The boom 17 can be swingingly moved between a substantially horizontal position, as shown in FIG. 1, and a generally upright position, as shown in FIG. 2, by loosening the screw 43.

Preferably the boom 16 is supported by the mounting devices A which offset said boom 16 relative to the boom 17 so that the two booms can be positioned alongside of each other back of the tractor. The mounting devices for the boom 16, as best shown in FIG. 4, comprise parts 41′, 42′, 43′, 44′ and 45′ similar to the previously described parts 41 to 45 inclusive. The radially notched boss 41′ of the bracket member 42′ interfits a mating boss 47 on the substantially straight upright support 32. The lower end portion of the support 32 is secured to the frame member 38 by parts 34′, 35′, 36′ and 37′ which are similar to the previously described parts 34 to 37 respectively. This mounts the boom 16 so that it can be swingingly adjusted about the axis of the bar 18 and about the bolt 43′ and can be longitudinally adjusted crosswise of the tractor, due to the clearance provided by the inverted J-shaped mounting member 33. Positioning the two booms 17 and 16 in overlapped relation crosswise of the back end of the tractor facilitates transportation on highways and the like. It is also possible to use the device for spraying purposes with the two booms in overlapped relation. This obviously doubles the number of spray nozzles per given length of boom and makes it possible to apply a heavier spray to the area over which the double boom is passed. Also providing for longitudinal adjustment of the booms makes it possible to adjust the positions of the spray nozzles 14 relative to rows of vegetation V1, FIG. 1.

The boom mounting devices C in FIG. 5 comprise a support 50 having, on its upper end portion, a cup shaped receptacle 51 provided with teeth 52. A mounting bracket 53 has a boss or hub 54 dimensioned to fit snugly within the cup 51 and provided with teeth 55 adapted to interfit with the teeth 52 in the cup. The remainder of the mounting bracket 53 is similar to the previously described mounting brackets 42 and 42′. A cap screw or bolt 56 is used to adjustably secure the two members 53 and 50 together. The interfitting cup 51 and hub 54 cooperate to provide a strong and substantial boom mount. In adjusting the bracket member 53 relative to the support 50 the screw 56 is loosened far enough to allow the teeth 52 and 55 to clear each other.

The boom mounting devices D in FIG. 6 comprise a support 60 having therein a plurality of holes 61 for the reception of one or more pins 62 on a mounting bracket 63. The bracket 63 has the same purpose and function as the previously described mounting brackets or plates 42 and 42′. A cap screw or bolt 64 is provided for securing the two parts 60 and 63 together. The screw 64 must be loosened far enough to permit withdrawal of the pin 62 from the holes 61 in adjusting the member 63 relative to the member 60.

Figure 7:
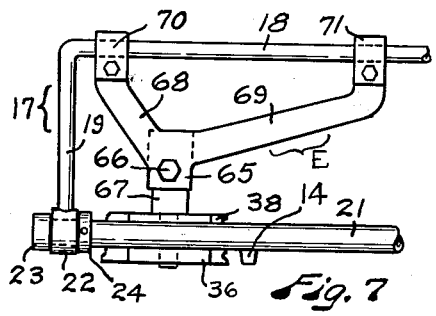
FIG. 7 is a fragmentary elevational view of a spray boom mounting device of still another modified form and which is well adapted for mounting long spray booms.

The boom mounting devices E shown in FIG. 7 comprise a block part 65 adjustably connected by a screw 66 with an upright support 67. The part 67 is supported from the frame member 38 in the same way as previously described parts 34 and 34′. Two support arms 68 and 69 are rigid with the block 65 and extend divergently upward therefrom. The arms 68 and 69 are respectively provided with clamp members 70 and 71 similar to the clamp member 44 shown in FIG. 3. The forked arms 68 and 69 support the bar 18 at two locations which are spaced apart a substantial distance. The FIG. 7 mounting is well adapted for use with relatively long spray booms. Also to minimize both vertical and horizontal vibration of the outer ends of long booms, the usual truss members each having one end connected with the outer end of a boom and the other end connected with the carrier vehicle forwardly of and above the boom may be used.

Figure 8:
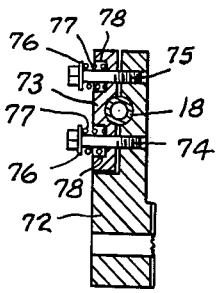
FIG. 8 is a fragmentary sectional view showing one part of a spray boom mounting device which has compression springs embodied in its construction.

FIG. 8 shows a mounting bracket 72 similar to the bracket 42 except that it has a clamp plate 73 held in engagement with a spray pipe supporting bar 18 by resilient means. At least two cap screws 74 and 75 extend through clamp plate 73 on opposite sides of bar 18 and are threaded into support member 72. Each screw 74 and 75 has a washer 76 which bears against a compression spring 77. Preferably each spring 77 seats within a recess 78 in clamp plate 73. Obviously the screws 74 and 75 can be adjusted to cause the springs 77 to apply variable clamping pressure to the bar 18. In use the screws 74 and 75 are preferably tightened sufficiently to clamp the bar 18 firmly enough so that said bar 18 will not move rotatively while the sprayer is in operation but can be rotatively moved quickly and easily in adjusting the elevation of the spray pipe 21 manually.

Suitable means of conventional form for supplying, under pressure, a solution to be sprayed is connected with each spray pipe 21. Preferably this means includes a liquid storage tank 80, pump devices of well known form disposed within a housing 81, but not herein shown in detail, conduits including flexible hoses 83 connecting the pump devices with each spray pipe 21, and control valves 84 of any desired form in the conduits formed in part by hoses 83.

Tractor mounted spraying equipment now in common use ordinarily requires three spray pipes or booms for each complete set up, with one spray pipe or boom extending across the end of the carrier vehicle and two spray pipes or booms extending outwardly from the respectively sides of said vehicle. Usually each of these three booms is independently supported by boom mounting means which must be completely unbolted in vertically adjusting the boom supported thereby. Adjusting booms of this type necessitates the expenditure of a substantial amount of time and labor. Also commonly used equipment of this type frequently necessitates the provision of several sets of booms with each spray outfit.

In accordance with my invention, as hereinbefore described, only two spray booms are required for each sprayer unit and each of these booms can be quickly and easily adjusted to meet any ordinary spraying requirement without completely unbolting or detaching the boom from the carrier vehicle. This results in a substantial saving in time and labor as well as a reduction in initial cost, due to a reduction in the number of spray booms required for each complete sprayer unit.

In using spray booms mounted as shown in FIGS. 1 to 4, when the booms 16 and 17 are in the lowered operating positions shown in FIGS. 1 and 3, the spray pipes 21 will be close enough to the ground for spraying the shortest vegetation V1 ordinarily sprayed. If taller vegetation, such as V2, FIG. 4, is to be sprayed the spray pipes of either or both booms can be vertically adjusted by swingingly or angularly adjusting the boom into an inclined position, such for instance as the position in which the boom 16 is shown in said FIG. 4, and at the same time rotatively adjusting the spray pipe or pipes so that the nozzles 14 will be directed downwardly. The height adjustment can be quickly and easily made by angularly moving the boom and it is possible to initially adjust the screws 45 and 45' so this adjustment can be made without manipulation of these screws. This is especially true where spring pressed bar clamping means of the form shown in FIG. 8 is used. Rotative adjustment of either spray pipe 21 requires manipulation of the set screw 28 by which said pipe is held. When the spray booms 16 and 17 are in an upright position, as shown in FIG. 2, they may used for spraying tall vegetation V3. Also in this upright position the spray booms are in a better position for transportation on highways and the like.

The foregoing description and accompanying drawings clearly disclose preferred embodiments of my invention but it will be understood that this disclosure is merely illustrative and that changes may be made within the scope of the following claims.

I claim:

1. In spraying apparatus, a wheel supported mobile frame, a spray pipe supporting bar; bar mounting devices adjustably mounting said spray pipe supporting bar for axially rotative and longitudinal and vertical swinging adjustment on said frame, said bar mounting devices being capable of supporting said bar in a substantially horizontal position; two spaced apart arms rigid with the respective end portions of said bar and extending outwardly therefrom; and a spray pipe rotatively adjustably supported by said arms in substantially parallel spaced apart relation to said bar, said spray pipe having radially directed spray discharge means adjustable by rotative adjustment of said pipe and said spray pipe being capable of vertical adjustment by rotatively adjusting said bar and thereby moving said spray pipe in a circular path around the axis of said bar when said bar is substantially horizontal.

2. In spraying apparatus, a wheel supported mobile frame; two spray pipe supporting bars; bar mounting devices adjustably mounting each bar for axially rotative longitudinal and vertical swinging adjustment on said frame, each bar mounting device being capable of supporting one of said bars in an approximately horizontal position, said two bars extending in opposite directions from said frame when they are approximately horizontal; two spaced apart arms rigid with each bar and extending outwardly from the respective ends of the bar; and two spray pipes supported by the arms of the respective bars with each spray pipe in substantially parallel spaced apart relation to the bar by which it is supported, each spray pipe being longitudinally adjustable by slidably adjusting its supporting bar in the bar mounting means thereof and being vertically adjustable by rotatively adjusting said supporting bar in the bar mounting means thereof and thereby moving the spray pipe in a circular path around the axis of its supporting bar when said bar is approximately horizontal.

3. In spraying apparatus, a wheel supported mobile frame; two spray pipe supporting bars; bar mounting devices adjustably mounting each bar for axially rotative longitudinal and vertical swinging adjustment on said frame, each bar mounting device being capable of supporting one of said bars in a substantially horizontal position and the two bar mounting devices being offset relative to each other, whereby when the two bars are horizontal they can be positioned alongside of each other and can be extended from opposite sides of said mobile frame; two spaced apart arms rigid with each bar and extending outwardly from the respective ends of the bar; and two spray pipes supported by the arms of the respective bars with each spray pipe in substantially parallel spaced apart relation to the bar by which it is supported, each bar and the arms and spray pipe connected therewith forming an open rectangular spray boom wherein the spray pipe is vertically adjustable by swingingly moving the boom on the axis of its bar and wherein the offset of the bar mounting means provides positioning of the two booms alongside of each other.

4. In spraying apparatus for use on a wheel supported vehicle having a frame, a spray pipe; a spray pipe supporting frame carrying said spray pipe and having a cylindrical part which is transversely offset from and is parallel to said spray pipe; an upright support member pivotally mounted on said vehicle frame for rotative adjustment on an upright axis; a clamp bracket receiving and adjustably clamping the cylindrical part of said spray pipe supporting frame providing both longitudinal and rotative adjustment in said clamp bracket of the clamped part of the spray pipe supporting frame; and a substantially horizontal pivot member adjustably connecting said clamp bracket with said upright support member for vertical swinging adjustment of the clamp bracket on an axis which is transverse to the upright axis of said upright support member and to the axis of the clamped cylindrical part of the spray pipe supporting frame, the spray pipe when in a substantially horizontal position being vertically adjustable by rotatively adjusting said spray pipe supporting frame in said clamp bracket and thereby moving said spray pipe in a circular path around the axis of the transversely offset cylindrical part of said spray pipe supporting frame.

References Cited in the file of this patent

UNITED STATES PATENTS

| | | |
|---|---|---|
| 622,226 | Homan | Apr. 4, 1899 |
| 872,654 | Heard | Dec. 3, 1907 |
| 999,676 | Schoelles | Aug. 1, 1911 |
| 1,886,369 | Bogart | Nov. 8, 1932 |
| 1,943,655 | Cummings | Jan. 16, 1934 |
| 2,586,636 | Fischer et al. | Feb. 19, 1952 |
| 2,618,509 | Carlson | Nov. 18, 1952 |
| 2,619,379 | Skifte | Nov. 25, 1952 |
| 2,622,831 | Fullwood | Dec. 23, 1952 |
| 2,770,493 | Fieber | Nov. 13, 1956 |
| 2,857,201 | Palmer | Oct. 21, 1958 |

FOREIGN PATENTS

| | | |
|---|---|---|
| 557,068 | Great Britain | Nov. 3, 1943 |